Patented Dec. 22, 1953

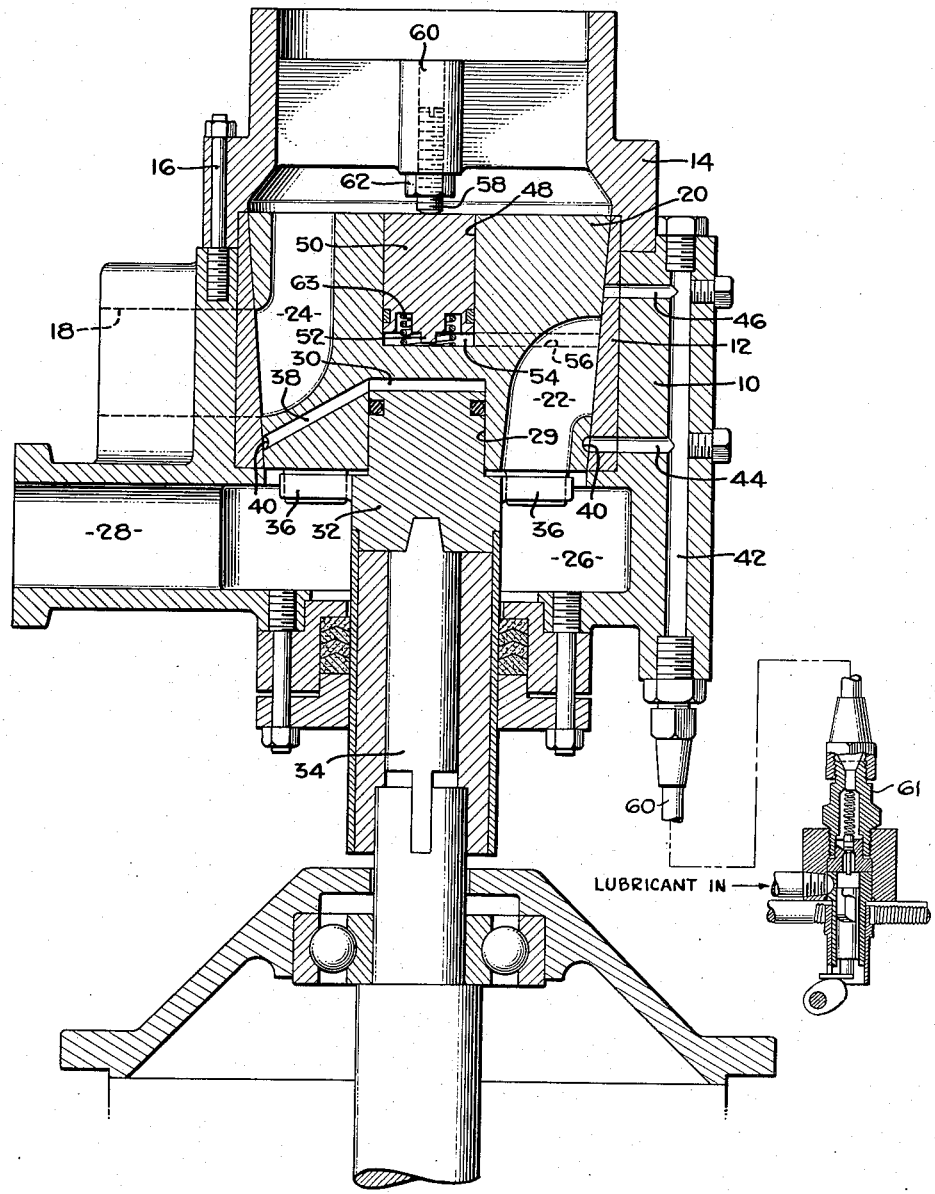

2,663,290

UNITED STATES PATENT OFFICE 2,663,290

ROTARY VALVE

Robert Braun Walder, Los Angeles, Calif.

Application March 31, 1948, Serial No. 18,132

10 Claims. (Cl. 123—190)

This invention relates to a rotary valve useful in internal combustion engines.

The main objects of this invention are to provide an improved rotary valve which is automatically seated by pressure of the gases being controlled; to provide a rotary valve in which the greater the pressure of the gases being controlled, the tighter it will be forced against its seat; to provide a rotary valve in which the contacting surface area is assured of lubrication, and to provide a rotary valve in which the pressure of the lubricating oil is utilized to unseat the valve and thereby permit the flow of the lubricant over the entire working surface area of the valve and its seat.

An illustrative embodiment of this invention is shown in the accompanying drawing in which:

The figure shown is a vertical, medial, section view taken of the improved valve mounted in a valve housing as adapted for use in conjunction with an internal combustion motor.

Heretofore many attempts have been made to utilize rotary valves to control the intake and exhaust ports of internal combustion motors. The main difficulties encountered in such applications have been that if the valve made a sufficiently tight fit on its seat so as to control the gases during the compression and particularly the power or combustion strokes, then it would tend to stick or freeze to its seat, and if the valve was free enough to rotate readily on its seat, then it would not be tight enough to seal the exhaust port during the compression and combustion strokes.

This difficulty has led to many unsuccessful attempts being made to lubricate a rotary valve. Moreover, the problem was presented that if the valve were to make a tight enough fit on its seat to properly seal the gases within the combustion chamber of an internal combustion motor, then it would be difficult or impossible to get a lubricant to spread over the working surfaces of the valve and valve seat.

In the present invention these difficulties have been entirely overcome by utilizing the gases confined under pressure to automatically urge the valve against its seat during the compression and combustion strokes and thereafter the valve is unseated by lubricant introduced under pressure so as to permit the working surfaces to have a flow of lubricant thereover. In other words, the rotating or rotary valve is intermittently and alternately forced on to or against its seat to effect a tight seal and then forced off its seat to permit a flow of lubricant over the working surfaces.

In the construction shown in the drawing, a valve housing 10 is provided with a valve seat insert 12, which is held in position against a shoulder by a top housing 14 secured thereto by a plurality of bolts or studs 16. The valve housing 10 and liner 12 are provided with a plurality of gas ports or openings 18 extending through the walls thereof in registry and which are adapted to be assembled in communication with a corresponding number of cylinders of an internal combustion engine.

A rotary valve of the usual tapered construction 20 is mounted within the valve housing in working contact with the liner 12, and is provided with intake and exhaust ports 22 and 24 respectively. The intake port 22 opens through the side wall of the rotary valve and down through an opening in a smaller end thereof to communicate with an annular intake passageway 26 to which a combustible gas is supplied through an intake passageway 28, which may be connected in communication with a carburetor or other suitable source of combustible gas, not shown. The exhaust port 24 also opens through the side wall of the rotary valve and its other end discharges fluidly through the larger end of valve 20 through the housing 14 and vented to the atmosphere.

The smaller end of the valve 20 is provided with a concentrically positioned axially disposed cylindrical bore 29 in which is received a piston 32, which is mounted on the top end of a vertically disposed drive shaft 34, and which rotates the valve 20 through the medium of radially extending lugs 36, which engage with axially extending bosses or abutments depending from the small end of the valve 20. The piston 32 and cylindrical bore 29 are so proportioned as to provide a chamber between the inner end of the piston 32 and the upper end of the cylindrical bore 29, and the valve is provided with a radially disposed axially inclined bore or passageway 38, one end of which communicates with the chamber 30, and the other end of which leads to the outer surface of the valve 20 where it communicates with a peripheral groove 40 formed in the outer surface of the valve.

Housing 10 is provided with a vertically disposed passageway 42, which is adapted to be connected to a source of lubricating oil under pressure. The passageway 42 leads to and communicates with a horizontally extending passageway 44, which leads to the inner surface of the liner 12, and also with a similar horizontal passageway 46, which also leads to the inner surface of the liner 12. The passageway 44 is located so as to be in registry with the peripheral groove 40 formed around the outer surface of the valve 20 so that lubricant entering through the passageway 42 under pressure will fill the groove 40 at all times and pass into the chamber 30 formed between the head of the piston 42 and the blind end of the cylindrical bore in which it is housed.

The top or large end of the tapered valve 20 is also provided with a concentrically disposed cylindrical bore 48 in which is slidable mounted piston 50. The inner end of the piston 50 is provided with a concentrically disposed depending boss 52 which serves as a spacer to keep the inner end of the piston 50 in spaced relation to the lower end of the bore 48, and thereby provides a chamber 54. The valve 20 is provided with a radially extending passageway 56, the inner end of which communicates with chamber 54, and the outer end of which opens through the outer wall of the valve in position to communicate with the ports 18. The piston 50 is held in adjusted position by a threaded stud 58, one end of which bears against the outer end of the piston 50, and the other end of which is threaded into the hub 60 of a spider integrally formed in the housing cap 14. A lock nut 62 is provided on the stud 58 for securing it in an adjusted position, and this position is preferably such that the lower free end of the boss 52 is in slightly spaced relation to the inner end of the bore 48, when the chamber 54 is filled with gas under pressure and the valve 20 firmly fits on its liner 12 with the piston 50 abutting the stud 58. Spring 63 applies a slight static pressure to valve 20 to initiate a sealing contact.

In the operation of this mechanism, when the valve 20 is in such position that the passageway 56 is in communication with a cylinder port 18, the gases within the cylinder either under compression or combustion will enter the chamber 54 and reacting against the housing through the piston 50, stud 58, and housing cap 14, will urge the valve 20 axially towards its small end and firmly in seat against the working surface of the liner 12.

The lubricating oil passageway 42 is connected by tubing 60 to a source which will supply lubricant under pressure intermittently. For example, the source may be a lubricant pump 61 that is of the same construction as a diesel fuel injector and operates in the same manner to feed lubricant periodically under pressure to the tubing 60. The timing is such that the pressure pulsations occur when the gas passageway 56 is not in communication with a port 18. As the lubricating oil under pressure flows through the passageway 42, passageway 44, groove 40 of the piston 20 and oil passageway 38 into the chamber 30, the fluid under pressure reacting through the piston 32, mounted on the drive shaft 34, forces the valve 20 axially upwards towards the large end of the valve, thereby separating the working surface sufficiently to permit a film of oil to flow thereover both from the passageway 44 and passageway 46. This axial movement of the valve 20 is permitted by reason of the clearance provided between the boss 52 and the inner end of the bore 48, as heretofore described.

Although but one specific embodiment of this invention has been shown and described, it will be understood that numerous details of construction shown may be altered or omitted without departing from the spirit of this invention.

I claim:

1. In a balanced rotary valve construction suitable for use in internal combustion engines, a housing having a valve seat therein, a rotary valve having a working fit on said seat, means for supplying a lubricant at timed intervals under pressure to the working surfaces of said valve and seat, a pressure chamber having one wall thereof reacting against said housing and other wall thereof reacting against said valve in a direction to unseat said valve, a duct providing communication between said chamber and the lubricant under pressure whereby said valve is unseated sufficiently at timed intervals to permit the lubricant to flow between the working surfaces of said valve and seat, said valve seat being further characterized by having a port therein controlled by said valve, a pressure chamber having one wall reacting against an end of said valve and a passageway in said valve providing communication between said pressure chamber and said valve seat port when said valve is in intermittently timed closed position with respect to said port whereby a fluid confined under pressure within said port will urge said valve against its seat.

2. A rotary valve for cooperation in the cyclic operation of an internal combustion engine comprising: stationary structure including a tapered valve seat, said structure providing a fuel passage, an exhaust passage, and a port for communication with the engine, a tapered valve member in said seat adapted for continuous rotation by the engine, and a pressure chamber for exerting fluid pressure on the valve member in a direction to tighten the valve member in said seat, said valve member having a first passage to intermittently place said fuel supply passage in communication with said port, a second passage to intermittently place said exhaust passage in communication with said port and an additional passage to place said port in communication with said chamber during time intervals when said first and second passages are out of communication with the port, whereby pressure from the engine periodically tightens said valve member in its seat.

3. A rotary valve as set forth in claim 2 in which said pressure chamber is formed in part by said valve member.

4. A rotary valve for cooperation in the cyclic operation of an internal combustion engine comprising: stationary structure including a tapered valve seat, said structure providing a lubricant passage communicating with said valve seat, a fuel supply passage, an exhaust passage, and a port for communication with the engine, a tapered valve member in said seat adapted for continuous rotation by the engine, a pressure chamber exerting fluid pressure on the valve member in a direction to loosen the valve member in said seat, said valve member having a first flow passage to intermittently place said fuel supply passage in flow communication with said port, a second flow passage to intermittently place said exhaust passage in communication with said port and an additional passage to place said pressure chamber in communication with said lubricant passage whereby pressure may be exerted through the lubricant to periodically loosen the valve member in said seat for spreading of lubricant around the valve member.

5. A rotary valve as set forth in claim 4 in which said pressure chamber is formed in part by said valve member.

6. A combination as set forth in claim 4 which includes means to periodically place the lubricant in said lubricant passage under pressure when the pressure from said engine in said port is relatively low.

7. A rotary valve for cooperation in the cyclic operation of an internal combustion engine comprising: stationary structure including a tapered valve seat, said structure providing a lubricant passage communicating with said valve seat, a fuel supply passage, an exhaust passage and a port for communication with the engine, a tapered valve member in said seat adapted for continuous rotation by the engine, a first pressure chamber for exerting fluid pressure on the valve member in a direction to tighten the valve member in said seat, a second pressure chamber for exerting fluid pressure on the valve member in a direction to loosen the valve member in said seat, said valve member having a first flow passage to intermittently place said fuel supply passage in full communication with said port, a second flow passage to intermittently place said exhaust passage in communication with said port, a third passage to place said port in communication with said first pressure chamber when said first and second passages are out of communication with said port whereby pressure from the engine periodically tightens said valve member in its seat, and a fourth passage to place said lubricant passage in communication with said second pressure chamber whereby pressure may be applied through the lubricant periodically to loosen the valve member in the seat and spread lubricant around the valve member.

8. A rotary valve as set forth in claim 7 in which both of said pressure chambers are formed in part by said valve member.

9. A combination as set forth in claim 7 which includes means to periodically place the lubricant in said lubricant passage under pressure when the pressure from said engine in said port is relatively low.

10. In a device of the character described wherein a port is subject to fluid pressure, the combination of: walls forming a circular valve seat having the configuration of a truncated cone and having said port in its periphery; a rotary valve member of the same configuration in said valve seat, said valve member having a valve passage therethrough for periodic registration with said port in the course of rotary movement of the valve member, said valve member being dimensioned to fit into said seat with clearance for the valve member to shift axially outward from the seat sufficiently for the injection of lubricant between the bottom surface of said seat and the bottom surface of the valve member; lubrication passages to introduce lubricant between the bottom of said valve member and the bottom of said seat; means to inject lubricant into said lubrication passages periodically with sufficient pressure to lift said valve member out of its seat; and means including a pressure chamber for returning said valve member into close fit with said seat, said valve member having a pressure communication passage from said pressure chamber to the periphery of the valve member for periodic registration with said port in time intervals between operations of said injecting means thereby to create periodic valve-returning pressure in said pressure chamber whereby the valve member is alternately lifted from its seat for lubrication and tightened in its seat with consequent spreading of the introduced lubricant.

ROBERT BRAUN WALDER.

References Cited in the file of this patent

UNITED STATES PATENTS

| Number | Name | Date |
|---|---|---|
| Re. 15,382 | Good | Jan. 13, 1922 |
| 1,015,116 | Ybarra | Jan. 16, 1912 |
| 1,461,296 | Tritt | July 10, 1923 |
| 1,614,890 | Kruttschnitt | Jan. 18, 1927 |
| 2,029,438 | Nordstrom | Feb. 4, 1936 |
| 2,111,597 | Lewis | Mar. 22, 1938 |
| 2,146,528 | Chilton | Feb. 7, 1939 |
| 2,305,874 | Isley | Dec. 22, 1942 |
| 2,364,658 | Ragsdale | Dec. 12, 1944 |
| 2,374,191 | Gernandt | Apr. 24, 1945 |

FOREIGN PATENTS

| Number | Country | Date |
|---|---|---|
| 540,067 | Great Britain | Oct. 3, 1941 |